(No Model.)
J. STEVENS & O. D. WARFIELD.
RAPIDLY ADJUSTABLE NUT FOR CALIPERS AND DIVIDERS.
No. 351,474. Patented Oct. 26, 1886.
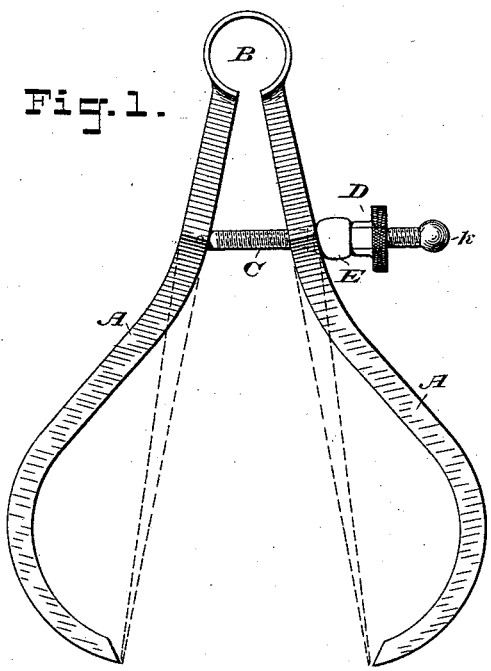
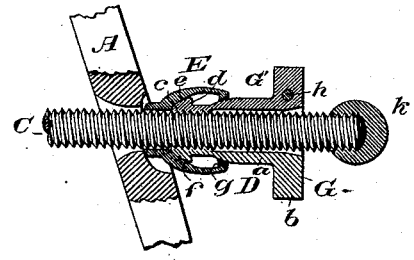
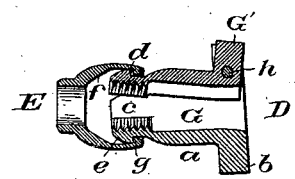
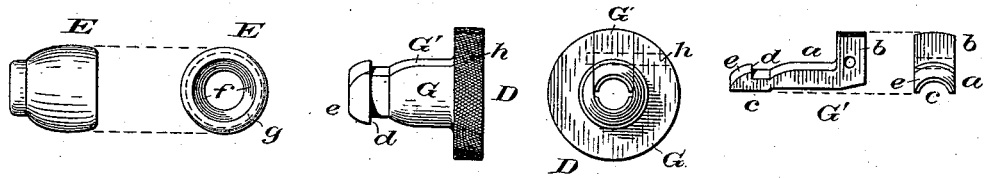
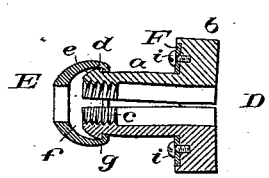
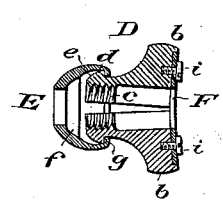
WITNESSES:
Geo. Bainton
Emilie Brinck
INVENTORS:
Joshua Stevens and
Oliver D. Warfield.
By their Attorneys,
Arthur O. Fraser & Co.

UNITED STATES PATENT OFFICE.

JOSHUA STEVENS AND OLIVER D. WARFIELD, OF CHICOPEE FALLS, MASSACHUSETTS, ASSIGNORS TO THE J. STEVENS ARMS AND TOOL COMPANY, OF SAME PLACE.

RAPIDLY-ADJUSTABLE NUT FOR CALIPERS AND DIVIDERS.

SPECIFICATION forming part of Letters Patent No. 351,474, dated October 26, 1886.

Application filed June 12, 1886. Serial No. 205,022. (No model.)

*To all whom it may concern:*

Be it known that we, JOSHUA STEVENS and OLIVER D. WARFIELD, citizens of the United States, both residing at Chicopee Falls, in the county of Hamden and State of Massachusetts, have invented certain new and useful Improvements in Spring Calipers, Dividers, &c., of which the following is a specification.

To screw the nut of spring calipers or dividers out or in for a considerable distance is very tedious and entails a considerable waste of time. To avoid this some attempts have been made to construct a quick-motion nut by dividing the nut and pivoting the sections thereof together in the manner of gripping-jaws, adapted to open and release the screw or to close and engage it. The nut is closed against the screw by means of a washer which slides on the screw, and which, when forced toward the nut acts by means of inclined surfaces to press the sections of the nut against the screw.

Our present invention provides a quick-motion nut and washer which are simple in construction, cheap to manufacture, and convenient and reliable in operation. The nut and washer are connected together in such manner that as the nut is drawn along the screw the washer follows it.

Figure 1 of the accompanying drawings is an elevation of spring-calipers provided with our invention. Fig. 2 is a fragmentary view on a larger scale, showing the leg, washer, and nut in section. Fig. 3 is a section of the nut and washer, showing the nut opened. Fig. 4 is a side elevation of the washer, and Fig. 5 is an end view of the same. Fig. 6 is a side elevation, and Fig. 7 a front elevation of the nut, and Fig. 8 comprises side and front views of one of the sections of the nut. Figs. 9 and 10 are sections of modified constructions of nuts and washers.

The caliper shown in Fig. 1 is of usual construction, having legs A A united by a spring, B, and with a screw, C, pivoted to one of the legs. and the nut D, screwing on it against the other leg. Any other known or suitable construction may be substituted for the one here shown. In dotted lines we have shown the instrument modified as a pair of dividers.

The nut D is formed with a tubular portion, *a*, and a milled head, *b*. The tubular portion *a* is threaded only near one end, at *c*, and from thence to the other end its bore is made large enough to pass freely over the screw C. The nut is made in two parts or sections, so divided that the screw-thread is formed half on one section and half on the other. One section is pivoted or hinged to the other, and is movable to engage or release the screw-thread. The threaded end of the nut is coned or beveled exteriorly at *e*.

E is the washer intervening between the nut D and the leg A of the caliper or divider. This washer incloses the threaded end of the nut, and when pressed toward the nut by the leg A it acts to press the two sections thereof together into engagement with the screw-threads. The washer is constructed with an internal coned or inclined surface, *f*, which at such time engages the coned surface *e* of the nut, as shown in Fig. 2. The nut may then be turned like any ordinary nut to adjust the caliper to the desired dimension. In order to quickly open or close the caliper, it is only necessary to compress the legs A A together sufficiently to release the pressure against the washer E, whereupon the threaded portion of the nut is no longer held closed against the screw, and the nut may then be slid freely along the screw in either direction. When it is brought to the desired position, the legs A A will be released and will expand against the washer, thereby again engaging the nut with the screw.

In order that when the nut is drawn away from the leg the washer E shall follow it, we connect the washer to the nut by any suitable means. The preferred means is to form interlocking shoulders on the nut and the washer, respectively. On the nut a shoulder, *d*, is formed just back of the incline *e*, and the washer is formed with an internal shoulder or inturned flange, *g*. When the nut is closed upon the screw, as shown in Fig. 2, the shoulders *d* and *g* are out of engagement; but when the nut is drawn back its shoulder $d$ encounters the shoulder $g$ in the washer, as shown in Fig. 3, and the washer is thereby drawn along with the nut. Thus our invention insures that the nut and washer shall always move together.

Many different constructions of divided or quick-motion nuts may be used with our invention, it being only requisite that there shall be an inclined or coned surface on either the washer or nut, (but not necessarily on both,) by means of which the pressing of the washer against the nut shall close the nut against the screw, and a shoulder or projection on the nut interlocking with a flange or shoulder on the washer, whereby in ordinary use the washer and nut move together.

In Figs. 1 to 3 and 6 to 8, inclusive, we have shown the construction of nut which we prefer. It consists of two pieces, G and G'. The piece G comprises the entire nut, with the exception of a space cut out along one side, as shown in Fig. 7, of a width about equal to or slightly wider than the diameter of the screw C. In this space fits the piece G', shown separately in Fig. 8, which is a section or jaw corresponding with the remainder of the nut and with it constituting a complete nut. This section is pivoted to the part G by a pivot-pin, $h$. The screw-threaded end $e$ of this section or jaw G' should engage the screw C for about half of its diameter, as shown. There is no spring acting upon the jaw G'. It is pressed into engagement with the screw by the washer E, and upon being released by the washer the movement of the nut by hand along the screw throws the jaw out sufficiently to clear the screw-threads. This construction of divided nut is very simple and cheap and quite effective and reliable in its operation.

Figs. 9 and 10 show two modifications of the nut, wherein it is divided diametrically into two sections, which are joined together by means of a spring-plate, F, instead of by a pivot-pin. This spring-plate is of disk or washer shape, and acts not only to connect together the two sections, but also to disengage their threaded ends from the screw on the release of the nut. It is connected to the sections by screws $i$ $i$, or otherwise. In Fig. 9 this spring-washer is applied to the front side of the head $b$ of the nut. In Fig. 10 it is applied to the rear side thereof.

With either construction of nut it is preferable that the nut and washer shall be inseparable while on the screw. This we accomplish by making the washer with its flange $g$ so contracted that the end $e$ $d$ of the nut cannot pass through it when the nut is on the screw; but when the nut is withdrawn from the screw its sections may be closed together or collapsed somewhat closer, and when so collapsed the end of the nut may be entered into the washer, after which both are slipped onto the screw. The end of the screw is provided with a head or knob, $k$, which is screwed onto it after the washer and nut have been put on, and which serves to prevent their slipping off the end of the screw during the use of the instrument.

Our invention provides, as we believe, the simplest, cheapest, and most convenient quick-motion nut and washer that have yet been produced. Its use is not limited to calipers and dividers, but it may be applied to other analogous instruments and tools wherever a quick-motion nut is desired.

What we claim, and desire to secure by Letters Patent, is—

1. The combination, with a quick-motion nut, of a washer for closing it upon the screw connected to it, substantially as described, whereby it moves with the nut as the latter is slid along the screw.

2. The combination of a quick-motion nut with a washer for closing it upon the screw, and shoulders on said nut and washer, respectively, reciprocally engaging each other, whereby the washer is caused to move with the nut.

3. The combination of nut D, having shoulder or projection $d$, with washer E, having internal shoulder or flange, $g$, inclosing the end of the nut and engaging the shoulder $d$ thereon, substantially as set forth.

4. The combination of a quick motion nut with a washer for closing it upon the screw, inclosing its end, engaging a shoulder or projection thereon and inseparable therefrom while the nut is on the screw, substantially as set forth.

5. A washer for a quick-motion nut, formed to inclose the end thereof, and having an internal flange or shoulder, $g$, substantially as and for the purpose specified.

6. A quick-motion nut, D, consisting of a section, G, with a head at one end and a screw-thread at the other, and recessed along one side, with a jaw, G', pivoted to it at said head and filling said recess, in combination with a washer engaging the exterior of the section G and jaw G' at their threaded end, substantially as set forth.

In witness whereof we have hereunto signed our names in the presence of two subscribing witnesses.

JOSHUA STEVENS.
OLIVER D. WARFIELD.

Witnesses:
SIDNEY SANDERS,
JOSEPH L. BEAUPRÉ.